(12) United States Patent
Kim et al.

(10) Patent No.: US 12,392,948 B2
(45) Date of Patent: Aug. 19, 2025

(54) DISPLAY APPARATUS PROVIDING EXPANDED EYE BOX

(71) Applicant: SAMSUNG ELECTRONICS CO., LTD., Suwon-si (KR)

(72) Inventors: Sunil Kim, Seoul (KR); Bongsu Shin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 697 days.

(21) Appl. No.: 17/736,209

(22) Filed: May 4, 2022

(65) Prior Publication Data

US 2023/0143529 A1     May 11, 2023

(30) Foreign Application Priority Data

Nov. 5, 2021 (KR) ........................ 10-2021-0151668

(51) Int. Cl.
| | |
|---|---|
| *G02B 5/32* | (2006.01) |
| *G02B 27/01* | (2006.01) |
| *G02B 27/30* | (2006.01) |
| *G06F 1/16* | (2006.01) |

(52) U.S. Cl.
CPC .......... *G02B 5/32* (2013.01); *G02B 27/0172* (2013.01); *G02B 27/30* (2013.01); *G06F 1/163* (2013.01); *G02B 2027/0123* (2013.01); *G02B 2027/0134* (2013.01); *G02B 2027/0174* (2013.01); *G02B 2027/0178* (2013.01)

(58) Field of Classification Search
CPC ...... G02B 5/32; G02B 27/0172; G02B 27/30; G02B 2027/0123; G02B 2027/0134; G02B 2027/0174; G02B 2027/0178; G02B 27/0103; G06F 1/163; G03H 1/04
See application file for complete search history.

(56) References Cited

U.S. PATENT DOCUMENTS

| | | | |
|---|---|---|---|
| 8,390,933 B2 | 3/2013 | Tanaka et al. | |
| 8,810,481 B2 | 8/2014 | Hayashibe et al. | |
| 8,934,160 B2 | 1/2015 | Sun | |
| 9,195,068 B2 | 11/2015 | Mizoguchi et al. | |
| 10,254,547 B2 | 4/2019 | Tremblay et al. | |
| 10,809,664 B2 | 10/2020 | Seo et al. | |
| 11,143,868 B2 | 10/2021 | Seo et al. | |
| 11,442,277 B2 | 9/2022 | Seo et al. | |
| 11,487,117 B2 | 11/2022 | Kim et al. | |
| 2014/0232651 A1 | 8/2014 | Kress et al. | |
| 2016/0103325 A1* | 4/2016 | Mirza | H04N 23/54 351/137 |

(Continued)

FOREIGN PATENT DOCUMENTS

| | | |
|---|---|---|
| KR | 10-2020-0063645 A | 6/2020 |
| KR | 10-2021-0048946 A | 5/2021 |
| WO | 2018/151807 A1 | 8/2018 |

*Primary Examiner* — Thomas K Pham
*Assistant Examiner* — Jennifer A Jones
(74) *Attorney, Agent, or Firm* — Sughrue Mion, PLLC

(57) ABSTRACT

A display apparatus providing an expanded eye box including: an image forming apparatus including a plurality of sub-areas respectively forming a plurality of different images; and a plurality of holographic optical elements corresponding to the plurality of sub-areas one-to-one, and collimating images emitted from the plurality of sub-areas to parallel beams having different emission directions, respectively.

22 Claims, 12 Drawing Sheets

(56) References Cited

U.S. PATENT DOCUMENTS

| | | |
|---|---|---|
| 2016/0379606 A1* | 12/2016 | Kollin .................. G03H 1/2294 345/428 |
| 2017/0061838 A1* | 3/2017 | Shi ......................... G09G 3/002 |
| 2017/0212349 A1 | 7/2017 | Bailey et al. |
| 2018/0067321 A1 | 3/2018 | Alexander et al. |
| 2018/0129052 A1 | 5/2018 | Morrison |
| 2018/0129053 A1 | 5/2018 | Morrison |
| 2018/0292660 A1 | 10/2018 | Eastwood |
| 2019/0041565 A1* | 2/2019 | Masson ................. G03H 1/0248 |
| 2020/0174255 A1* | 6/2020 | Hollands ............. G02B 27/0103 |
| 2020/0264435 A1 | 8/2020 | Urness et al. |
| 2021/0191123 A1 | 6/2021 | Leister et al. |
| 2022/0171186 A1 | 6/2022 | Seo et al. |
| 2022/0179210 A1 | 6/2022 | Kim et al. |

\* cited by examiner

DISPLAY APPARATUS PROVIDING EXPANDED EYE BOX

CROSS-REFERENCE TO RELATED APPLICATION

This application is based on and claims priority under 35 U.S.C. § 119 to Korean Patent Application No. 10-2021-0151668, filed on Nov. 5, 2021, in the Korean Intellectual Property Office, the disclosure of which is incorporated by reference herein in its entirety.

BACKGROUND

1. Field

The disclosure relates to a display apparatus providing an expanded eye box.

2. Description of the Related Art

Recently, along with the development of electronic apparatuses and display apparatuses capable of implementing virtual reality (VR), interest in such apparatuses has increased. As a next step of VR, technology for implementing augmented reality (AR) and mixed reality (MR) has been researched.

Unlike VR that is based on a complete virtual world, AR is a display technique that shows the real world and overlaps virtual objects or information thereon, thereby further increasing the effect of reality. While VR is limitedly applied only to fields such as games or virtual experience, AR is advantageous in that AR may be applied to various real environments. For example, AR attracts attention as next-generation display technology suitable for a ubiquitous environment or an Internet of things (IoT) environment. AR may be an example of MR in that AR shows a mixture of the real world and additional information.

In order to manufacture a display apparatus capable of realizing such AR, for example, in the form of a head mounted type, glasses type, or goggles type, research is being conducted to miniaturize an optical system combining the real world with a virtual image. In addition, in a general AR display apparatus, it is necessary to place the eye at a very small focal size so that the correct image may be viewed, and even if the eye position is slightly out of the focus position, the image may improperly viewed. Therefore, research is being conducted to enlarge an eye box to observe an image.

SUMMARY

Provided are display apparatuses providing an expanded eye box.

Additional aspects will be set forth in part in the description which follows and, in part, will be apparent from the description, or may be learned by practice of the presented embodiments of the disclosure.

According to an aspect of the disclosure, there is provided a display apparatus including: an image forming apparatus including a plurality of sub-areas respectively configured to form a plurality of images by using light; and a plurality of holographic optical elements corresponding to the plurality of sub-areas one-to-one, each of the plurality of holographic optical elements configured to collimate light emitted from the plurality of sub-areas corresponding to the plurality of images into respective parallel beams, wherein each of the respective parallel beams are emitted in different directions such that at least two of the respective parallel beams overlap on a user's pupil to form an eye box.

Each of the plurality of images may have image information corresponding to different gaze directions.

A first image, among the plurality of images, may have first image information according to a first emission direction of first parallel beams collimated by a first holographic optical element, among the plurality of holographic optical elements, and a second image, among the plurality of images, may have second image information according to a second emission direction of first parallel beams collimated by a second holographic optical element, among the plurality of holographic optical elements.

A first gaze direction of the first image information may correspond to the first emission direction, and a second gaze direction of the second image information may correspond to the second emission direction.

At least two of the plurality of images may have different parallaxes.

The plurality of sub-areas may include a first left-eye sub-area, a second left-eye sub-area, a first right-eye sub-area, a second right-eye sub-area, wherein the plurality of holographic optical elements comprise a first left-eye holographic optical element, a second left-eye holographic optical element, a first right-eye holographic optical element and a second right-eye holographic optical element, wherein a first left-eye image formed in the first left-eye sub-area and a first right-eye image formed in the first right-eye sub-area have binocular parallax, and each of the first left-eye image and the first right-eye image has image information about a first gaze direction, and wherein a second left-eye image formed in the second left-eye sub-area and a second right-eye image formed in the second right-eye sub-area have binocular parallax, and each of the second left-eye image and the second right-eye image has image information about a second gaze direction that is different from the first gaze direction.

The plurality of holographic optical elements may be arranged parallel to each other in a first direction, and the eye box may be formed parallel to the first direction.

The plurality of holographic optical elements may be in contact with each other.

A long axis length of the eye box may be equal to or greater than a pupil size.

A long axis length of the eye box may be about 5 mm to about 20 mm.

The plurality of sub-areas may simultaneously output the plurality of images, and the respective parallel beams are transmitted through the entire eye box at a same time.

The plurality of images may be formed on a user's retina.

The display apparatus may further include a projection optical system configured to project images generated in the plurality of sub-areas between the image forming apparatus and the plurality of holographic optical elements.

The projection optical system may include a collimator configured to collimate the light emitted from the plurality of sub-areas corresponding to the plurality of images.

The projection optical system may include a plurality of sub-projection optical systems in one-to-one correspondence with the plurality of sub-areas, and the plurality of sub-projection optical systems may be between the image forming apparatus and the plurality of holographic optical elements.

The plurality of sub-projection optical systems may include: a first sub-projection optical system configured to a first image emitted from a first sub-area from among the plurality of sub-areas onto a first holographic optical element from among the plurality of holographic optical elements, and a second sub-projection optical system configured to project a second image emitted from a second sub-area from among the plurality of sub-areas onto a second holographic optical element from among the plurality of holographic optical elements.

The display apparatus may include a head-mounted virtual reality (VR) or augmented reality (AR) display apparatus.

According to another aspect of the disclosure, there is provided a display apparatus including: an image forming apparatus configured to output a plurality of images; a first holographic optical element configured collimate first light corresponding to a first image, among the plurality of images emitted from the image forming apparatus, into first parallel beams; and a second holographic optical element configured collimate second light corresponding to a second image, among the plurality of images emitted from the image forming apparatus, into second parallel beams, wherein the first parallel beams and the second parallel beams overlap on a user's pupil to form an eye box.

The image forming apparatus may include a plurality of sub-areas respectively configured to form the plurality of images.

According to another aspect of the disclosure, there is provide a display method including: outputting, by an image forming apparatus, a plurality of images; collimating, by a first holographic optical element, first light corresponding to a first image, among the plurality of images emitted from the image forming apparatus, into first parallel beams; and collimating, by a second holographic optical element, second light corresponding to a second image, among the plurality of images emitted from the image forming apparatus, into second parallel beams, wherein the first parallel beams and the second parallel beams overlap on a user's pupil to form an eye box.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
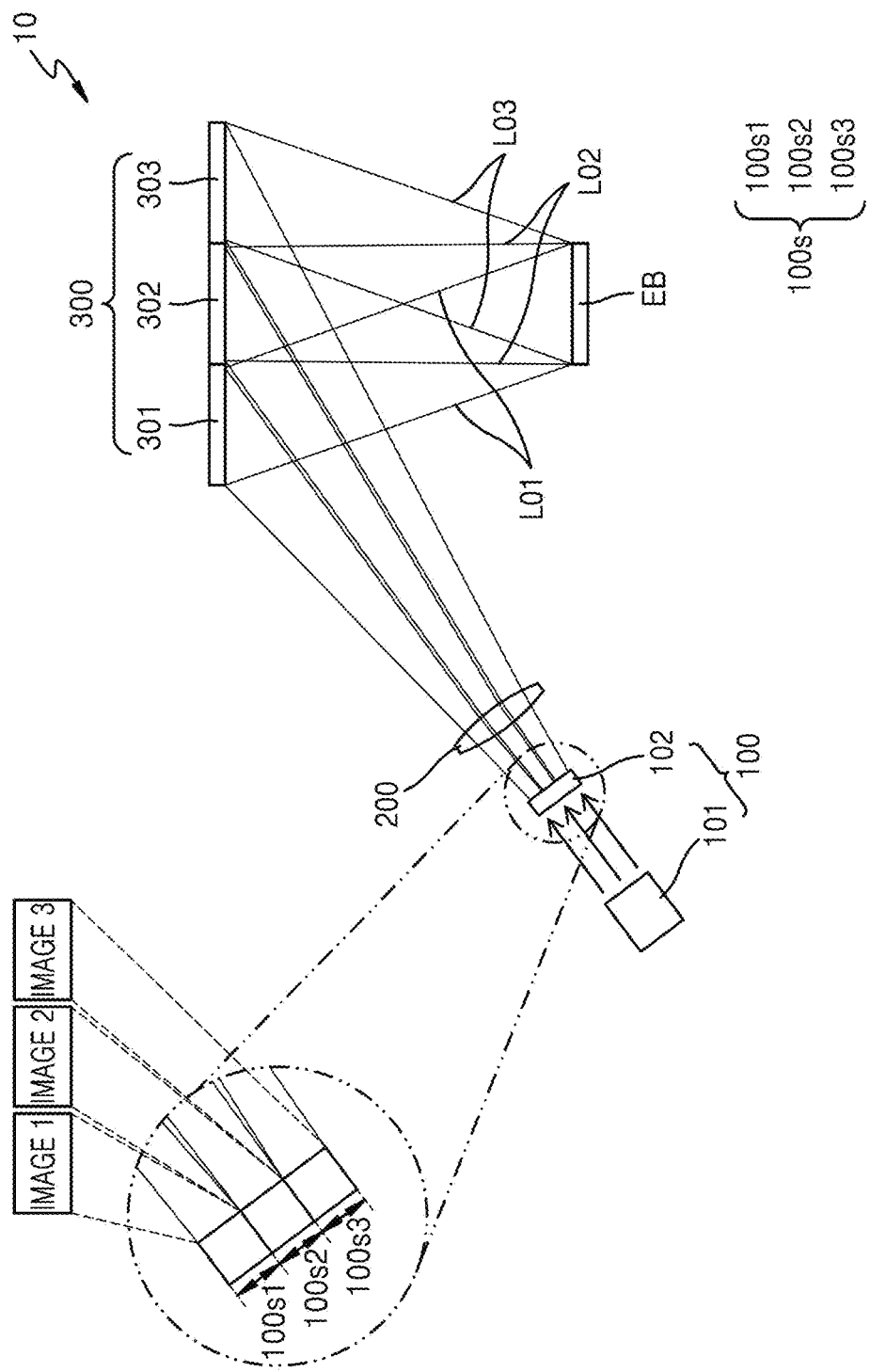
FIG. 1 is a schematic view of a configuration of a display apparatus according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings. The embodiments described below are only examples, and thus, it should be understood that the embodiments may be modified in various forms. Like reference numerals refer to like elements throughout. In the drawings, the sizes of constituent elements may be exaggerated for clarity.

For example, when an element is referred to as being "on" or "above" another element, it may be directly on the other element, or intervening elements may also be present. Likewise, when an element is referred to as being "under" or "below" another element, it may be directly under the other element, or intervening elements may also be present.

As used herein, the singular forms "a," "an," and "the" are intended to include the plural forms as well, unless the context clearly indicates otherwise. In addition, it will be understood that when a unit is referred to as "comprising" another element, it may not exclude the other element but may further include the other element unless specifically oppositely indicates.

The use of the terms "a," "an," and "the" and similar referents is to be construed to cover both the singular and the plural.

Further, the use of any and all examples, or exemplary language (e.g., "such as") provided herein, is intended merely to better illuminate the inventive concept and does not pose a limitation on the scope of the disclosure unless otherwise claimed.

It will be understood that although the terms "first," "second," etc., may be used herein to describe various components, these components should not be limited by these terms. These components are only used to distinguish one component from another.

The fact that length units such as size, height, depth, and thickness are substantially the same may include differences within an error range recognized by those of ordinary skill in the art.

Parallel light is not limited to a parallel beam having an infinity focus, and may include a quasi-parallel beam having a sufficiently far focus.

The fact that two straight lines are parallel to each other is not limited to meaning that the two straight lines do not meet each other even if they are extended, and may include differences within an error range recognized by those of ordinary skill in the art, which may include two substantially parallel straight lines in one area because an angle between the two straight lines is sufficiently small.

An image formed in one of a plurality of sub-areas may correspond to light emitted from the one sub-area.

Figure 2A:
FIGS. 2A to 2C are views of respective images of a plurality of sub-areas of a display apparatus according to an example embodiment.
Figure 2B:
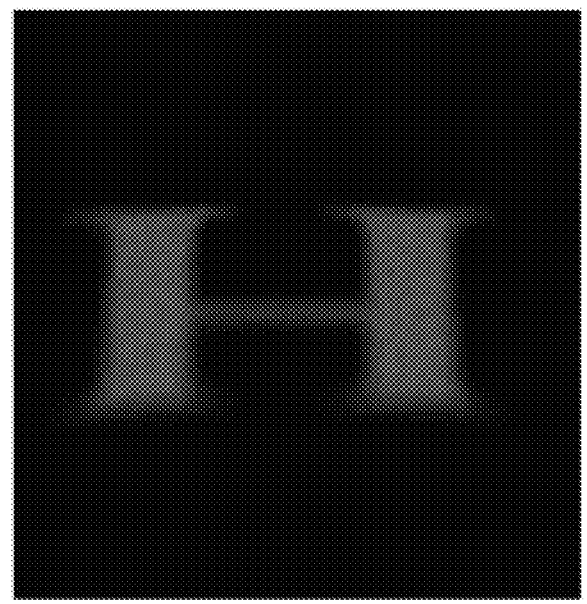
Figure 2C:
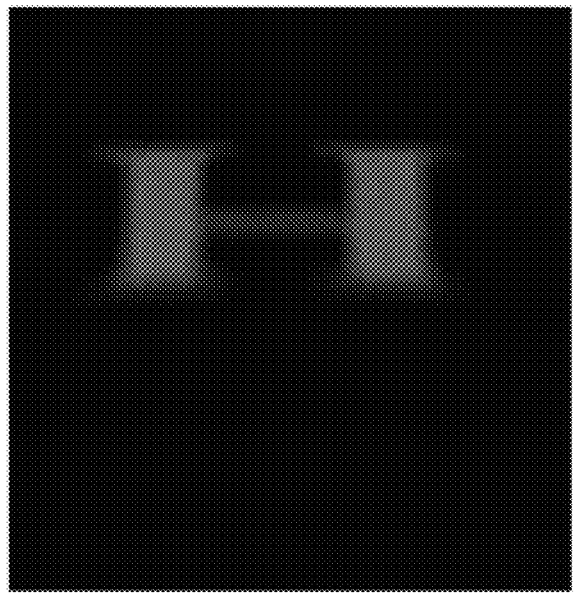
Figure 3A:
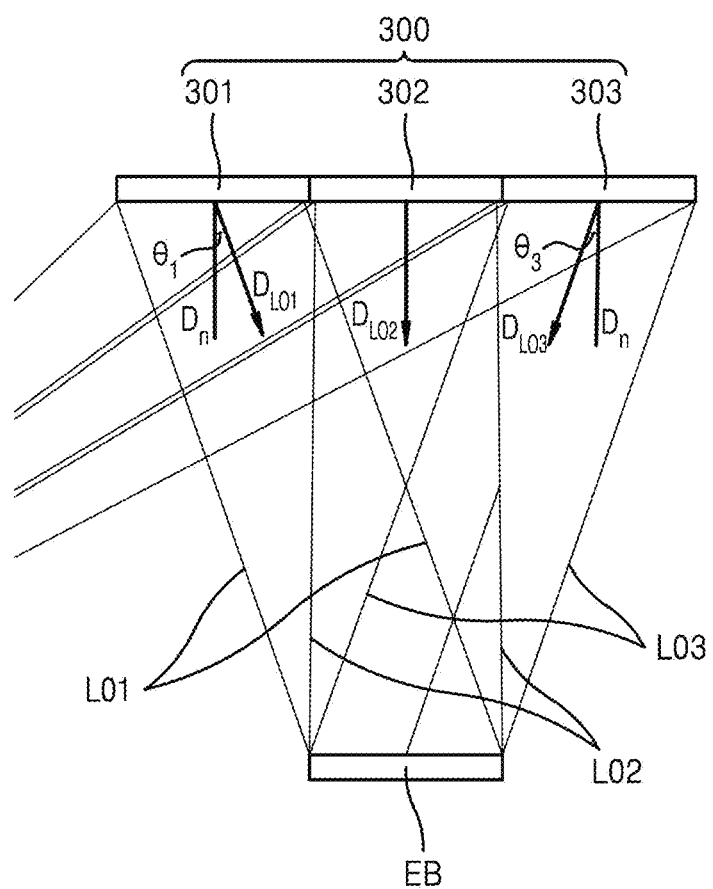
FIG. 3A is an enlarged view of a parallel beam diffracted from a plurality of holographic optical elements of the display apparatus of FIG. 1.
Figure 3B:
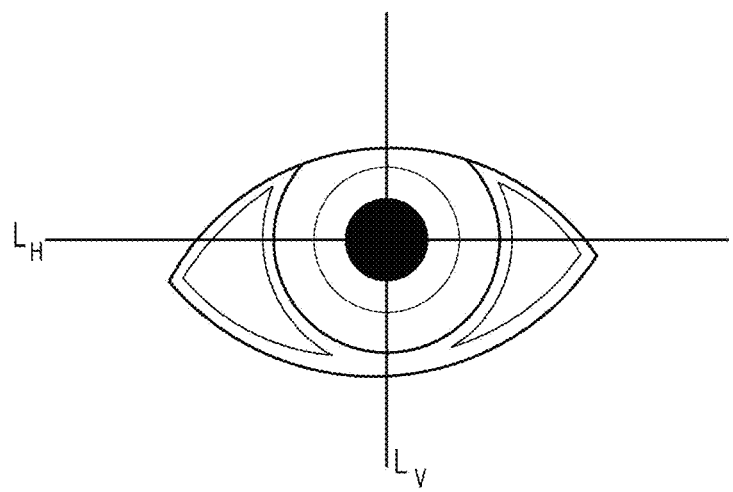
FIG. 3B is a view of horizontal and vertical lines of a user's eye.

FIG. 1 is a schematic view of a configuration of a display apparatus according to an example embodiment. FIGS. 2A to 2C are views of respective images of a plurality of sub-areas of a display apparatus according to an example embodiment. FIG. 3A is an enlarged view of a parallel beam diffracted from a plurality of holographic optical elements of the display apparatus of FIG. 1. FIG. 3B is a view of horizontal and vertical lines of a user's eye.

Referring to FIG. 1, a display apparatus 10 according to an example embodiment may include an image forming apparatus 100 including a plurality of sub-areas 100s (i.e., 100s1, 100s2 and 100s3) respectively forming a plurality of images by using light, and a plurality of holographic optical elements 300 that correspond one-to-one with the plurality of sub-areas 100s and collimate images respectively emitted from the plurality of sub-areas 100s into parallel beams L01, L02, and L03 having different emission directions. The plurality of holographic optical elements 300 may be configured such that the respective parallel beams L01, L02, and L03 are superimposed on the user's pupil to form an eye box EB. Pieces of light diffracted from the plurality of holographic optical elements 300 does not converge to one point, but may be incident in a direction of a user's eye as the parallel beams L01, L02, and L03, thereby providing the eye box EB. In addition, the plurality of images may be different images having image information about different gaze directions, and thus, a different image may be provided according to a gaze direction viewed by the user's pupil in the eye box EB.

The display apparatus 10 according to an example embodiment may include the image forming apparatus 100. The image forming apparatus 100 may be configured to form a display image containing virtual reality or virtual information. To form an image, the image forming apparatus 100 may include a light source 101 and a spatial light modulator (SLM) 102. In addition, the image forming apparatus 100 may further include an image processor that provides a digital image data signal to the spatial light modulator 102. For example, the light source 101 may use collimated white light as illumination light, or may include a light emitting diode (LED) and a collimating lens. For example, the spatial light modulator 102 may include a liquid crystal modulator having an array of a plurality of pixels arranged in two dimensions. An image provided from the image forming apparatus 100 may be a general two-dimensional image. According to an example embodiment, the image forming apparatus 100 may further include a memory and a processor. The processor may be a central processing unit (CPU) or other processors configured to execute one or more instructions stored in the memory. According to an example embodiment, the memory may be a volatile or non-volatile memory. According to an example embodiment, the memory may be Random Access Memory (RAM), Read-only Memory (ROM) or other types of memory storing instructions. The instructions may be stored as program codes to be executed by the processor.

According to another example, the light source 101 may be a coherent light source emitting coherent light. For example, the light source 101 may include a laser diode (LD) light source. The spatial light modulator 102 may be configured to display a hologram pattern according to a hologram data signal provided from an image processor, for example, a computer generated hologram (CGH) signal. For example, the spatial light modulator 102 may be a phase modulator capable of performing only phase modulation, an amplitude modulator capable of performing only amplitude modulation, and a complex modulator capable of performing both phase modulation and amplitude modulation. In this case, an image provided from the image forming apparatus 110 may be a holographic image having three-dimensional information.

Although the spatial light modulator 102 is shown as a transmissive type in FIG. 1, the disclosure is not limited thereto, and a reflective spatial light modulator may be used. As a transmissive spatial light modulator, the spatial light modulator 102 may use a semiconductor modulator based on a compound semiconductor such as GaAs, or a liquid crystal device (LCD). As a reflective spatial light modulator, the spatial light modulator 120 may use, for example, a digital micromirror device (DMD), liquid crystal on silicon (LCoS), or a semiconductor modulator.

The image forming apparatus 100 may include the plurality of sub-areas 100s respectively forming a plurality of images. Each of the plurality of sub-areas 100s may include the light source 101 and the spatial light modulator 102. According to an example embodiment, each of the plurality of sub-areas 100s may include a separate light source and a spatial light modulator. However, the disclosure is not limited thereto, and as such, two or more of the plurality of sub-areas 100s may share a light source and a spatial light modulator. The plurality of sub-areas 100s and the plurality of holographic optical elements 300 may have a one-to-one correspondence. For example, an image formed in one sub-area 100s1, 100s2, or 100s3, that is, an image emitted from the one sub-area 100s1, 100s2, or 100s3, may be incident only to a holographic optical element 301, 302, or 303 corresponding to the one sub-area 100s1, 100s2, or 100s3. For example, an image emitted from sub-area 100s1 may be incident only to holographic optical element 301, an image emitted from sub-area 100s2 may be incident only to holographic optical element 302, and an image emitted from sub-area 100s3 may be incident only to holographic optical element 303. To this end, in the display apparatus 10 according to an example embodiment, a projection optical system 200 may be provided between the image forming apparatus 100 and the plurality of holographic optical elements 300, and the influence of an image incident on each of the holographic optical elements 301, 302, and 303 on different areas may be reduced.

In the image forming apparatus 100, areas respectively occupied by the plurality of sub-areas 100s may be the same as or different from each other. Even if the areas of the plurality of sub-areas 100s are different from each other, pieces of light emitted from the plurality of sub-areas 100s may be projected by the projection optical system 200 to correspond to the plurality of holographic optical elements 300, respectively.

A plurality of images provided from the plurality of sub-areas 100s may be different images, and may be images having image information about different gaze directions. Alternatively, the plurality of images may be images viewed from different gaze directions. For example, the first image may be an image having image information about a frontal gaze direction, that is, an image viewed from a frontal direction of a virtual object. For example, the second image may be an image having image information about a gaze direction inclined by about 10 degrees from a normal to a horizontal line LH of the eye, and in other words, may be an image viewed in the gaze direction inclined by about 10 degrees from the normal to the horizontal line LH of the eye. Referring to FIGS. 2A to 2C, each image may include information about the same virtual object, but may be image information about different gaze directions, that is, an image that changes as a gaze direction changes, may be provided.

Alternatively, the plurality of images provided from the plurality of sub-areas 100s may include image information according to emission directions of the parallel beams L01, L02, and L03 collimated by the plurality of holographic optical elements 300 corresponding one-to-one to the plurality of images, respectively. For example, an image provided from a first sub-area 100s1 may be incident on the first holographic optical element 301, and may be emitted as the first parallel beam L01 having a first emission angle with a normal direction perpendicular to the first holographic optical element 301. At this time, when the first holographic optical element 301 is arranged toward the horizontal line LH of the eye from the center, the image provided from the first sub-area 100s1 may be first virtual image information viewed in a direction of the first emission angle (or a first exit direction) toward the horizontal line LH of the eye with respect to the normal.

Gaze directions of the image information of the plurality of images and emission directions of images collimated into the parallel beams L01, L02, and L03 may correspond to each other. Referring to FIGS. 3A and 3B, an image provided from the first sub-area 100s1 incident in a first emission direction DL01 to the eye box EB through the first holographic optical element 301 may include image information according to the first emission direction DL01. In other words, the image provided from the first sub-area 100s1 may include first virtual image information viewed from a normal Dn to the horizontal line LH of the eye at a first emission angle θ1 (or the first emission direction DL01). An image provided from a second sub-area 100s2 incident to the eye box EB in a second emission direction DL02 through the second holographic optical element 302 may include image information according to the second emission direction DL02. In other words, the image provided from the second sub-area 100s2 may include second virtual image information viewed from the normal Dn to the horizontal line LH of the eye at a second emission angle θ2 (or the second emission direction DL02). An image provided from the third sub-area 100s3 incident to the eye box EB in a third emission direction DL03 through the third holographic optical element 303 may include image information according to the third emission direction DL03. In other words, the image provided from the third sub-area 100s3 may include third virtual image information viewed from the normal Dn to the horizontal line LH of the eye at a third emission angle θ3 (or the third emission direction DL03).

In the above example, the plurality of holographic optical elements 300 are arranged toward the horizontal line LH of the eye, and the plurality of images include image information about different gaze directions with respect to the horizontal line LH of the eye, but are not limited thereto. When the plurality of holographic optical elements 300 are arranged toward a vertical line LV of the eye, the plurality of images may include image information about different gaze directions with respect to the vertical line LV of the eye. Referring to FIGS. 2A to 2C, the plurality of images may be images in different gaze directions with respect to the vertical line LV of the eye. In addition, when the plurality of holographic optical elements 300 are arranged in the horizontal and vertical directions, the plurality of images may include image information about a gaze direction inclined toward a direction in which the plurality of holographic optical elements 300 are located based on the user's eyes.

The plurality of sub-areas 100s may simultaneously output a plurality of images. Accordingly, all of the plurality of images may reach the eye box EB. However, the disclosure is not limited thereto and may be configured to output only a portion of the plurality of images.

The display apparatus 10 according to an example embodiment may include the projection optical system 200. The projection optical system 200 may be configured to project an image formed by the image forming apparatus 100 (i.e., light emitted from the image forming apparatus 100) onto the plurality of holographic optical elements 300. Although the projection optical system 200 is shown as one lens element for convenience in FIG. 1, the projection optical system 200 may actually include a plurality of lens elements to compensate for aberration and distortion. In addition, in order not to block an optical path between the plurality of holographic optical elements 300 and the observer's eyes, the projection optical system 200 may be disposed to be inclined with respect to a direction in which the plurality of holographic optical elements 300 are arranged side-by-side. In this case, light projected by the projection optical system 200 may be inclinedly incident on the plurality of holographic optical elements 300.

The projection optical system 200 may include a collimator capable of collimating an image formed by the image forming apparatus 100. Images emitted from the plurality of sub-areas 100s may be collimated in the same direction while passing through the collimator. Furthermore, the projection optical system 200 may further include an optical element such as a lens for changing an optical path so that light may be incident on each of the holographic optical elements 301, 302, and 303. However, the disclosure is not limited thereto. The projection optical system 200 may be provided so that pieces of light of the one sub-area 100s1, 100s2, or 100s3 may be projected only to the one holographic optical element 301, 302, or 303 corresponding to the pieces of light.

The display apparatus 10 according to an example embodiment may include the plurality of holographic optical elements 300 that collimate images respectively emitted from the plurality of sub-areas 100s into the parallel beams L01, L02, and L03 having different emission angles. Referring to FIG. 3A, the first holographic optical element 301 may collimate incident light into the first parallel beam L01 having the first emission angle θ1 (or in the first emission direction DL01), the second holographic optical element 302 may collimate incident light into the second parallel beam L02 having the second emission angle θ2 (or in the second emission direction DL02), and the third holographic optical element 303 may collimate incident light into the third parallel beam L03 having the third emission angle θ3 (or in the third emission direction DL03). One end surface of each of the first parallel beam, the second parallel beam, and the third parallel beam may overlap, and the eye box EB may be formed in the overlapping area. All of the first parallel beam L01, the second parallel beam L02, and the third parallel beam L03 may be transmitted through the entire eye box EB.

A Maxwellian view optical system, which collects image information at a point in the pupil and then scans the image information into the retina, forms a discontinuous very narrow eye box by spatially separated focal points, and an image cannot be viewed even slightly outside the eye box. On the other hand, the eye box EB formed by the display apparatus 10 according to an example embodiment is an extended eye box EB through which the parallel beams L01, L02, and L03 are transmitted over the entire eye box EB, and may be a continuous eye box in which a plurality of images are formed on the user's retina in the entire eye box EB. That is, in the case of the display apparatus 10 including the Maxwellian view optical system, even if an eye box including a plurality of focal points is formed, when the user's pupil deviates from one focal point in the discontinuous eye box, an image cannot be viewed, whereas the display apparatus 10 according to an example embodiment forms a continuous eye box EB through which the parallel beams L01, L02, and L03 are transmitted, so that an image may be continuously viewed even when the user's pupil moves within the eye box EB.

To this end, the plurality of images simultaneously output from the plurality of sub-areas 100s may be collimated into the parallel beams L01, L02, and L03 by the plurality of holographic optical elements 300, and each of the parallel beams L01, L02, and L03 may be transmitted simultaneously over the entire eye box EB. Simultaneous transmission of the parallel beams L01, L02, and L03 may mean that they are transmitted substantially and simultaneously even though optical paths are different because the speed of light is sufficiently high. In addition, a plurality of images may be formed on the user's retina. The position where the plurality of images are formed may be different from the position of the user's retina.

The first emission angle θ1, the second emission angle θ2, and the third emission angle θ3 may be values in the form of monotonically increasing or monotonically decreasing, but are not limited thereto, and may be values increasing or decreasing at irregular intervals.

The first holographic optical element 301 may include fine two-dimensional or three-dimensional patterns of materials having different refractive indices to diffract incident light and collimate the incident light at a certain emission angle (or in an emission direction). Then, even if the incident light is non-parallel, the first parallel beam L01 may be emitted by diffracting light at a certain emission angle (or emission direction) according to the size, height, period, etc. of the patterns.

Figure 4:
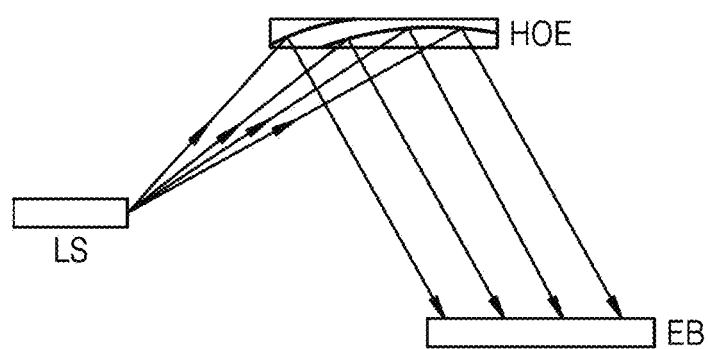
FIG. 4 is a view illustrating that light emitted from one light source is incident on a holographic optical element and is emitted as a parallel beam.

FIG. 4 is a view illustrating that light emitted from one light source is incident on a holographic optical element and is emitted as a parallel beam.

Referring to FIG. 4, light emitted from a light source LS may be light that is not collimated and is emitted. When the light emitted from the light source LS is incident on a holographic optical element HOE, the light may be collimated by a pattern formed according to the position of each incident angle, and may be emitted as a parallel beam. In FIG. 4, the holographic optical element HOE has a pattern for collimating the light emitted from one light source LS, but is not limited thereto. A holographic optical element having a pattern for collimating light emitted from a sub-area may be manufactured.

Figure 5A:
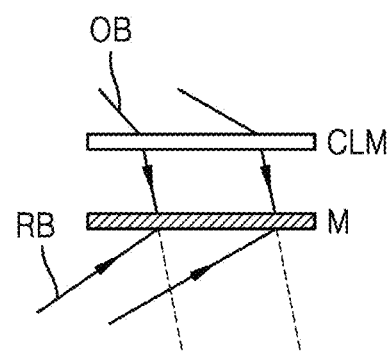
FIG. 5A is a schematic view illustrating recording of irradiating a reference beam and an objective beam to a photoconductor for manufacturing a holographic optical element.
Figure 5B:
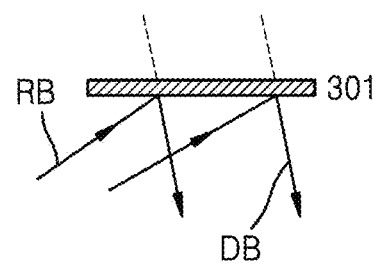
FIG. 5B is a schematic view of an optical path of the holographic optical element and reference beam manufactured according to FIG. 5A.

FIG. 5A is a schematic view illustrating recording of irradiating a reference beam and an objective beam to a photoconductor for manufacturing a holographic optical element, and FIG. 5B is a schematic view of an optical path of the holographic optical element and reference beam manufactured according to FIG. 5A.

In order to fabricate a first holographic optical element pattern in which light emitted from a first sub-area is collimated into a first parallel beam, a reference beam RB having an identical divergence angle as light projected through the projection optical system 200 after being emitted from the first sub-area may be irradiated onto a first surface of a flat photoconductor M. In this case, an incident angle at which the reference beam RB is incident on the photoconductor M may be set to be the same as an angle at which light is incident on a first holographic optical element. At the same time, using a collimator CLM, etc., an objective beam OB, which passes through the photoconductor from a second surface opposite to a first surface of the photoconductor M and is collimated at a first emission angle (or in a first emission direction) with respect to a vertical surface of the photoconductor M, may be irradiated onto the photoconductor M. At this time, an interference pattern between the reference beam RB and the objective beam OB is formed on the photoconductor M, and the first holographic optical element may be manufactured by developing the photoconductor M exposed by the interference pattern.

When light having the same divergence angle as that of the reference beam RB is incident on a first surface of the first holographic optical element 301 formed as described above at the same incident angle as that of the reference beam RB, light diffracted from the first surface of the first holographic optical element 301 may be collimated at the first emission angle while traveling in the same direction as that of the object light OB to form a first parallel beam.

Referring back to FIG. 3A, the first holographic optical element 301, the second holographic optical element 302, and the third holographic optical element 303 may be arranged in parallel in one direction, and the second holographic optical element 302 and the third holographic optical element 303 may be implemented in the same manner as the first holographic optical element 301 described above. A first parallel beam LO1 collimated at the first emission angle θ1 (or in the first emission direction DL01) by the first holographic optical element 301, a second parallel beam L02 collimated at the second emission angle θ2 (or in the second emission direction DL02) by the second holographic optical element 302, and a third parallel beam L03 collimated at the third emission angle θ3 (or in the third emission direction DL03) by the third holographic optical element 303 may overlap in a certain area, and the overlapping area may form the eye box EB. The first parallel beam LO1, the second parallel beam L02, and the third parallel beam L03 may include first image information, second image information, and third image information having different gaze directions, respectively.

In a case where the user's pupil is located in the eye box EB formed by the display apparatus 10 according to an example embodiment, when a user turns a gaze direction to the first emission angle θ1 (or in the first emission direction DL01), first virtual image information may be mainly focused on the user's retina. When the user turns the gaze direction to the second emission angle θ2 (or in the second emission direction DL02), second virtual image information may be mainly focused on the user's retina. When the user turns the gaze direction to the third emission angle θ2 (or in the third emission direction DL03), third virtual image information may be mainly focused on the user's retina.

In the example according to FIGS. 3A to 5B, three different pieces of virtual image information are formed using the first to third holographic optical elements 301, 302, and 303. However, the number of holographic optical elements 300 and the number of images are merely examples for helping understanding, and are not limited thereto. For example, the number of holographic optical elements 300 may be selected as four or more within the limit allowed by an internal space of the display apparatus 10.

The eye box EB formed by the display apparatus 10 according to an example embodiment may be relatively wider than an eye box provided through a general Maxwellian view optical system, and light may be uniformly incident into the eye box EB.

A length of a long axis of the eye box EB formed by overlapping the parallel beams L01, L02, and L03 may be equal to or greater than the pupil size, and the length of the long axis of the eye box EB may have a size of about 5 mm to about 20 mm. For example, the eye box EB may have a size of about 7 mm*7 mm.

The plurality of holographic optical elements 300 may be arranged in parallel in one direction, and side surfaces thereof may be in contact with each other. The eye box EB may be formed parallel to the one direction. However, the disclosure is not limited thereto, and the eye box EB may be formed not to be parallel to the one direction. In addition, the plurality of holographic optical elements 300 may not be arranged in parallel in one direction, or may be apart from each other without contacting each other.

Figure 6:
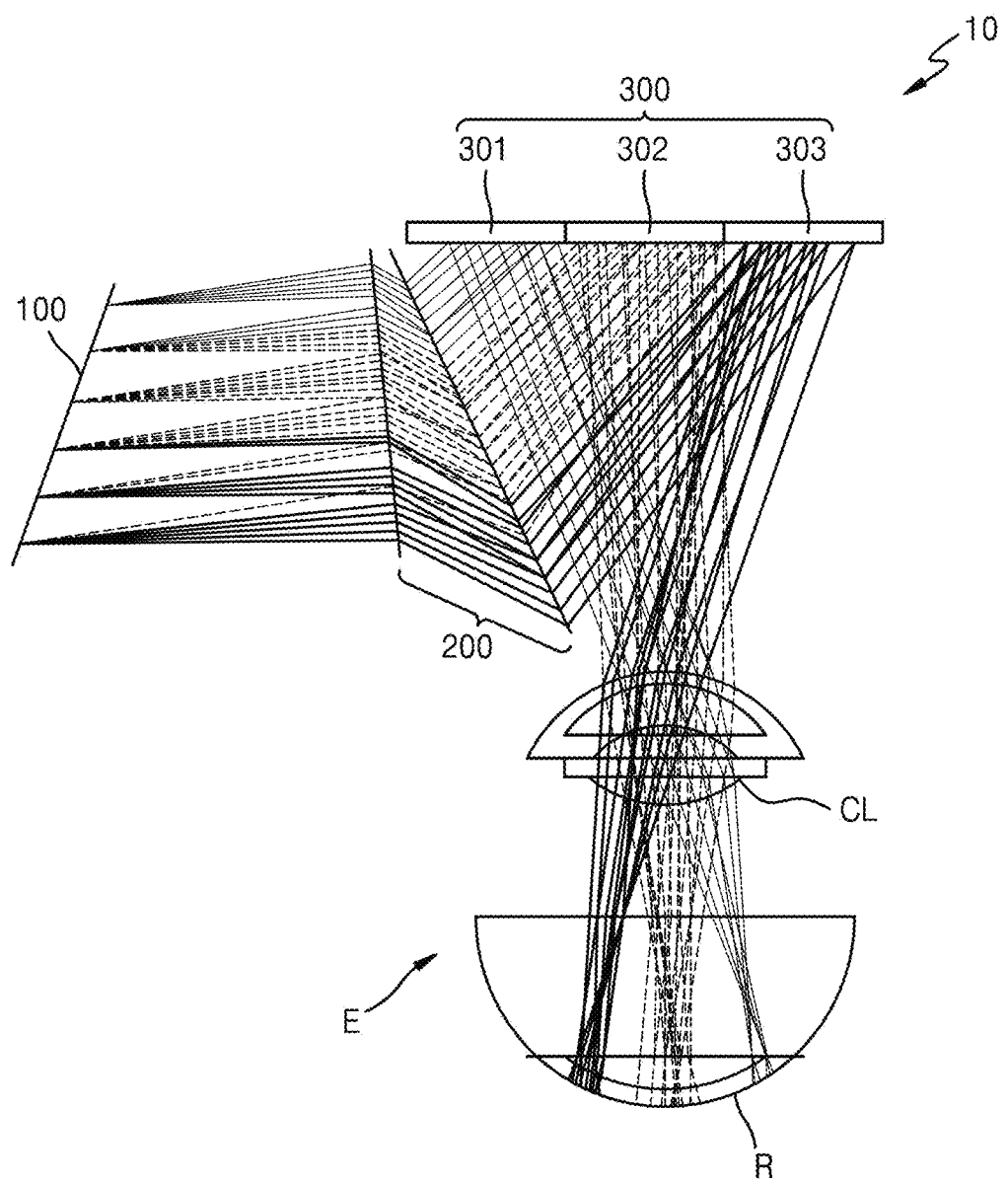
FIG. 6 is a schematic view of a configuration of a display apparatus according to an example embodiment.

FIG. 6 is a schematic view of a configuration of the display apparatus 10 according to an example embodiment.

Referring to FIG. 6, light may be emitted for each sub-area through the image forming apparatus 100 including LCoS. The projection optical system 200 may include a lens for changing an optical path, a collimator, and the like. The plurality of holographic optical elements 300 may be manufactured with reference to the method of FIGS. 5A and 5B through the reference beam RB of the image forming apparatus and the projection optical system 200. For example, the first holographic optical element 301 may collimate light incident at a certain angle at a first emission angle (or in a first emission direction). A first parallel beam collimated by the first holographic optical element 301 may be a quasi-parallel beam. A second parallel beam collimated by the second holographic optical element 302 and a third parallel beam collimated by the third holographic optical element 303 may also be a quasi-parallel beam. The first to third parallel beams may form the eye box EB in front of the user's pupil, be refracted through a user's lens CL, and be incident on a retina R in the user's eye to form an image.

The display apparatus 10 according to an example embodiment may provide the expanded eye box EB by not focusing light on the user's pupil using the Maxwellian view optical system, but by using the plurality of holographic optical elements 300 to collimate light to emit the parallel beams L01, L02, and L03. In addition, when the Maxwellian view optical system is used, a discontinuous eye box in which an image is formed on the user's retina is provided only when the pupil is located at a focused position within the eye box, whereas, in the display apparatus, a plurality of images may be incident on the entire eye box EB, and thus, the display apparatus may provide a continuous eye box in which an image is formed on the user's retina regardless of the position of the pupil in the eye box EB. The display apparatus 10 according to an example embodiment may be driven without a separate eye-tracking sensor for tracking the eyes and thus may be easily manufactured and operated in a simple manner. However, the display apparatus 10 may further include an eye tracking sensor. In addition, by employing the plurality of holographic optical elements 300 rather than an optical waveguide, the display apparatus 10 according to an example embodiment may be relatively thin and light in weight, and may be easily manufactured.

Figure 7:
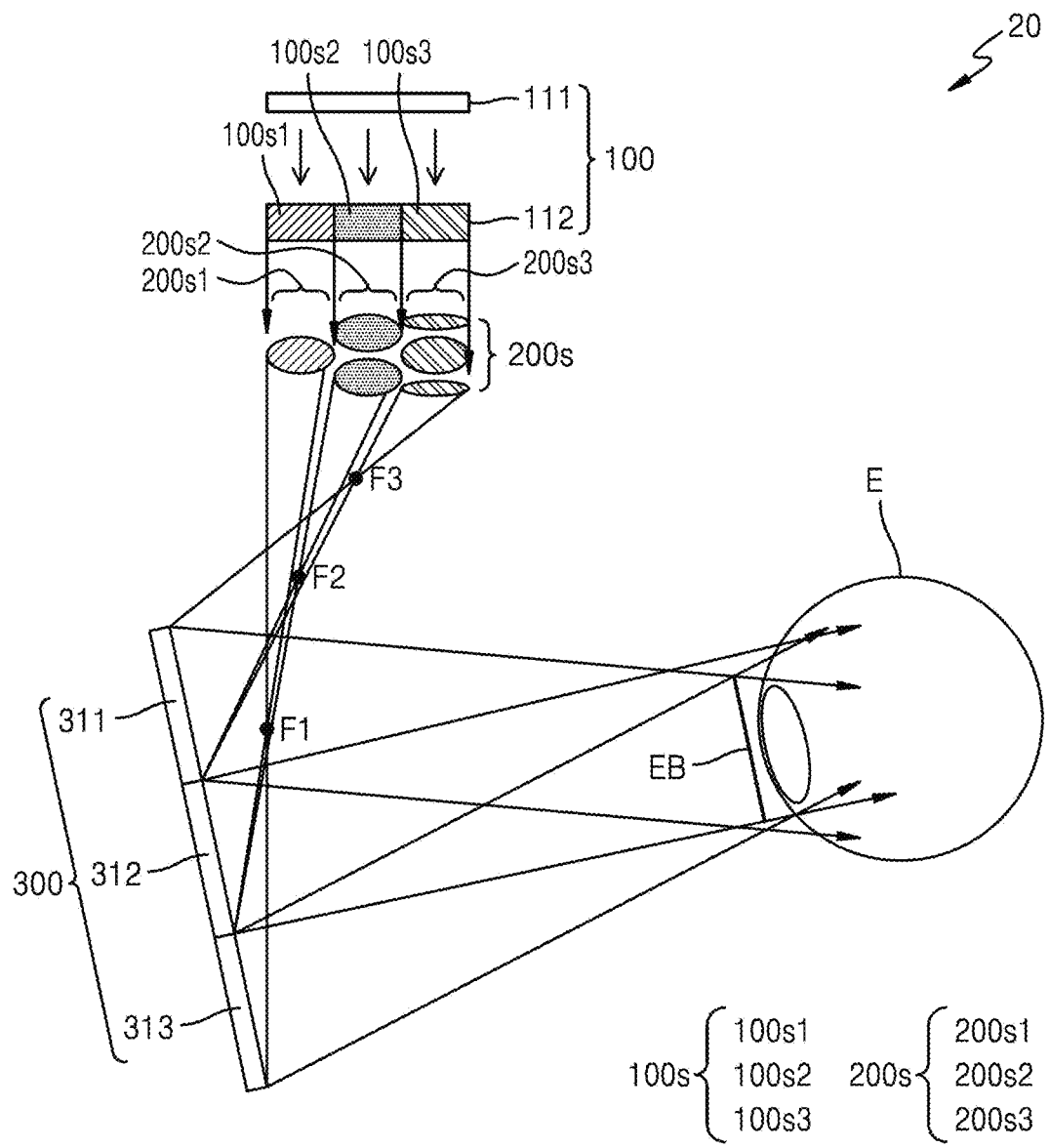
FIG. 7 is a view schematically illustrating that an optical projection system of a display apparatus according to the example embodiment includes a plurality of sub-projection optical systems.

FIG. 7 is a view schematically illustrating that an optical projection system of a display apparatus according to the example embodiment includes a plurality of sub-projection optical systems.

Referring to FIG. 7, a projection optical system of a display apparatus 20 according to an example embodiment may include a plurality of sub-projection optical systems 200s, and the plurality of sub-projection optical systems 200s may correspond to the plurality of sub-areas 100s on a one-to-one basis. The image forming apparatus 100 may include a light source 111 and a spatial light modulator 112, and may be divided into the first sub-area 100s1, the second sub-area 100s2, and the third sub-area 100s3. For example, a second sub-projection optical system 200s2 may cause an image emitted from the corresponding second sub-area 100s2 to be incident on a second holographic optical element 312 corresponding to the second sub-area 100s2, and may be disposed on an optical path between the second sub-area 100s2 and the second holographic optical element 312 to reduce the ratio of an image incident to non-corresponding first and third holographic optical elements 311 and 313. Each of sub-projection optical systems 200s1, 200s2, and 200s3 may include at least one lens element. For example, each of the sub-projection optical systems 200s1, 200s2, and 200s3 may include at least one convex lens to form focal points F1, F2, and F3 where light converges on an optical path between the sub-areas 100s1, 100s2, and 100s3 and the holographic optical elements 311, 312, and 313, and light is emitted again after passing through the focal points F1, F2, and F3 so that most of the light may be incident on the holographic optical elements 311, 312, and 313 corresponding thereto. Through this, an image incident on one holographic optical element does not affect different holographic optical elements, so that images may be distinguished relatively reliably.

The display apparatus 10 illustrated in FIG. 1 may provide an image to only one eye of the user. However, the display apparatus 10 may be configured to provide an image to both eyes of the user.

Figure 8:
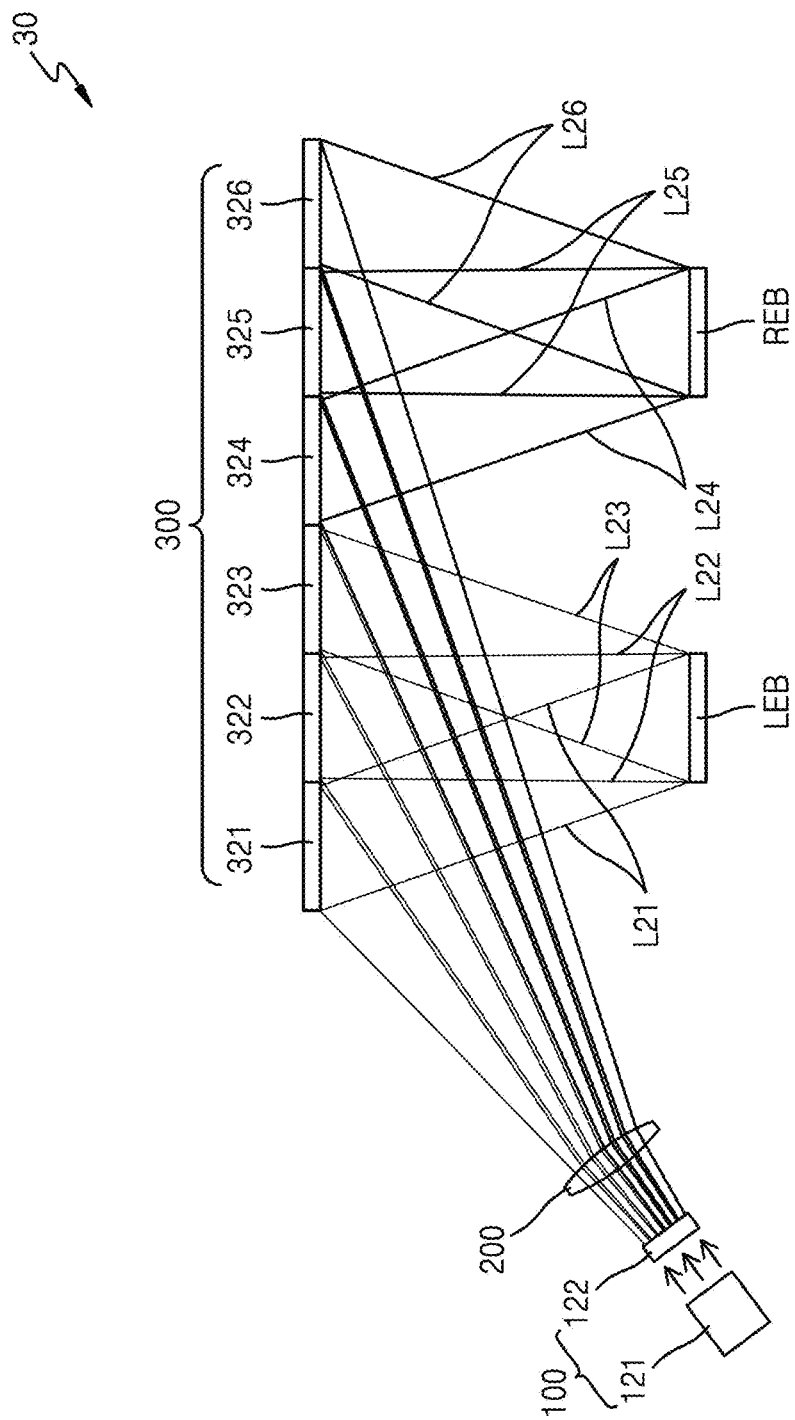
FIG. 8 is a schematic view illustrating that a display apparatus according to an example embodiment is applied to both eyes.

FIG. 8 is a schematic view illustrating that a display apparatus according to an example embodiment is applied to both eyes.

A plurality of images may be images having different parallaxes. The images having different parallaxes may be images viewed from different positions. For example, the images viewed from different positions may be images viewed from positions of the left and right eyes that are apart from each other. In this case, the plurality of images may reflect binocular parallax, so that a three-dimensional stereoscopic image may be provided to the user.

The plurality of images may be images having the same gaze direction information but different parallaxes, images having the same parallax but different gaze direction information, or images having different gaze direction information and different parallaxes.

The plurality of sub-areas may include a first left-eye sub-area, a second left-eye sub-area, a first right-eye sub-area, and a second right-eye sub-area, and the plurality of holographic optical elements 300 may include a first left-eye holographic optical element, a second left-eye holographic optical element, a first right-eye holographic optical element, and a second right-eye holographic optical element corresponding to the plurality of sub-areas, respectively.

An image emitted from the first left-eye sub-area may be diffracted by the first left-eye holographic optical element, collimated into a parallel beam having a first emission angle (in a first exit direction), and incident on the left eye, and an image emitted from the first right-eye sub-area may be diffracted by the first right-eye holographic optical element, collimated into a parallel beam having a first emission angle (in the first exit direction), and incident on the right eye. Each of a first left-eye image formed in the first left-eye sub-area and a first right-eye image formed in the first right-eye sub-area may be an image having binocular parallax when the left and right eyes look in the same gaze direction.

An image emitted from the second left-eye sub-area may be diffracted by the second left-eye holographic optical element, collimated into a parallel beam having a second emission angle (or in a second exit direction) different from the first emission angle (in the first exit direction), and incident on the left eye, and an image emitted from the second right-eye sub-area may be diffracted by the second right-eye holographic optical element, collimated into a parallel beam having a second emission angle (or in the second exit direction), and incident on the right eye. Each of a second left-eye image formed in the second left-eye sub-area and a second right-eye image formed in the second right-eye sub-area may be an image having binocular parallax when the left and right eyes look in the same gaze direction.

Because both the first left-eye image and the second left-eye image are incident on the left eye, there may be no parallax or the first left-eye image and the second left-eye image may be images viewed from different gaze directions. Because both the first right-eye image and the second right-eye image are incident on the right eye, there may be no parallax or the first right-eye image and the second right-eye image may be images viewed from different gaze directions.

Referring to FIG. 8, a display apparatus 30 according to an example embodiment may include the image forming apparatus 100 for forming a left-eye image and a right-eye image, the projection optical system 200 for projecting light of the left-eye image and light of the right-eye image emitted from the image forming apparatus 100, and the plurality of holographic optical elements 300 for collimating the pieces of light projected from the projection optical system 200 into parallel beams L21, L22, L23, L24, L25, and L26 having different emission angles. The image forming apparatus 100 may include a light source 121 and a spatial light modulator 122. In this case, first to third holographic optical elements 321, 322, and 323 from among the plurality of holographic optical elements 300 may be left-eye holographic optical elements, and fourth to sixth holographic optical elements 324, 325, and 326 from among the plurality of holographic optical elements 300 may be right-eye holographic optical elements. At this time, the projection optical system 200 may be configured to project both light of a left-eye image and light of a right-eye image, or may be divided into a left-eye projection optical system for projecting light of a left-eye image and a right-eye projection optical system for projecting light of a right-eye image.

Images emitted from first to third sub-areas forming a left-eye image may be projected by the projection optical system 200 and incident on the first to third holographic optical elements 321, 322, and 323 respectively corresponding to the images. First to third images respectively formed in the first to third sub-areas may be different images according to a gaze direction of the left eye.

Images emitted from fourth to sixth sub-areas forming a right-eye image may be projected by the projection optical system 200 and incident on the fourth to sixth holographic optical elements 324, 325, and 326 respectively corresponding to the images. Fourth to sixth images respectively formed in the fourth to sixth sub-areas may be different images according to a gaze direction of the right eye. In this case, the fourth parallel beam L24 diffracted by the fourth holographic optical element 324, which is a holographic optical element for the right eye, may be substantially parallel to the first parallel beam L21 diffracted by the first holographic optical element 321, which is a left-eye holographic optical element. In addition, the fifth parallel beam L25 diffracted by the fifth holographic optical element 325 may be substantially parallel to the second parallel beam L22 diffracted by the second holographic optical element 322. Similarly, the sixth parallel beam L26 diffracted by the sixth holographic optical element 326 may be substantially parallel to the third parallel beam L23 diffracted by the third holographic optical element 323.

The first image and the fourth image may be images located in the same gaze direction from the left eye and the right eye, respectively, but may be different images viewed at different angles depending on the parallax between the left and right eyes. Similarly, the second image and the fifth image, and the third image and the sixth image may be images located in the same gaze direction from the left eye and the right eye, respectively, but may be different images viewed at different angles depending on the parallax between the left and right eyes.

A left-eye eye box LEB may be formed in an area where the first to third parallel beams L21, L22, and L23 collimated by the first to third holographic optical elements 321, 322, and 323 overlap, a right-eye eye box REB may be formed in an area where the fourth to sixth parallel beams L21, L22, and L26 collimated by the fourth to sixth holographic optical elements 324, 325, and 326 overlap.

Figure 9:
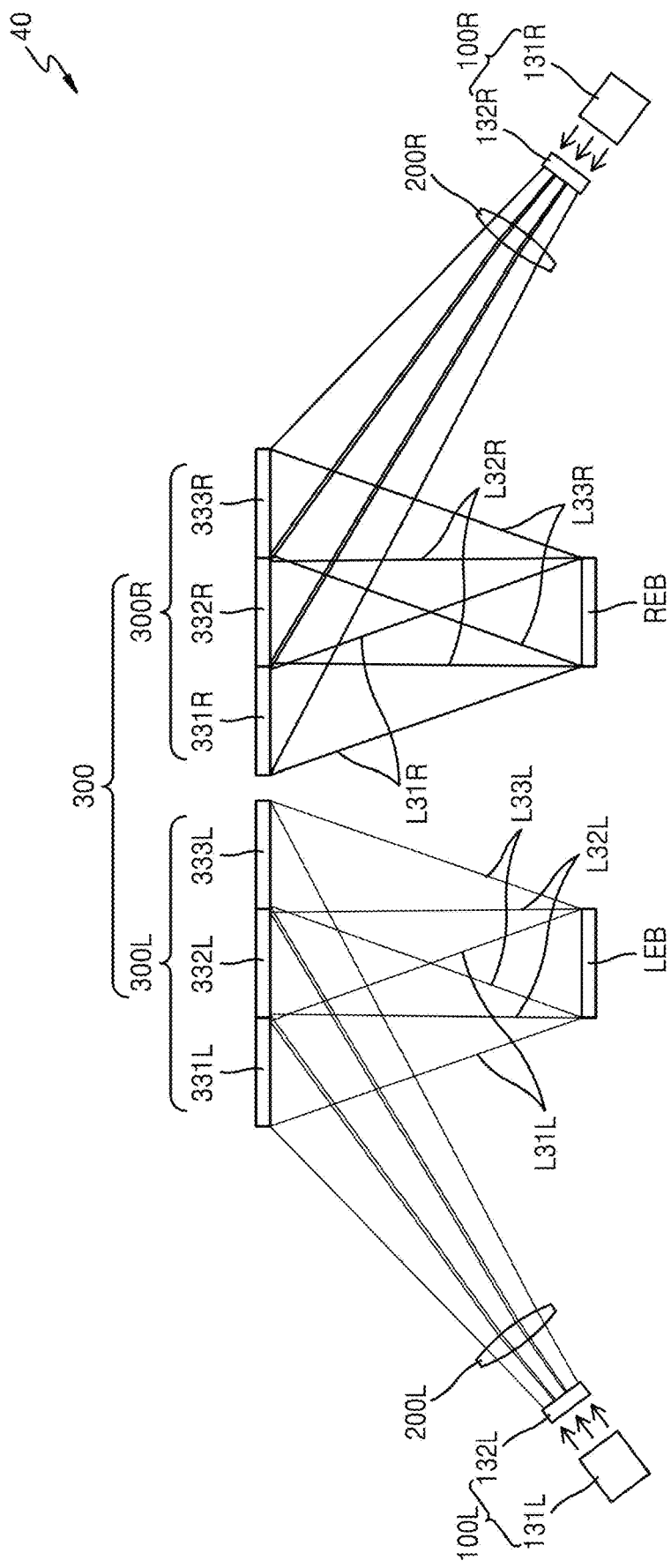
FIG. 9 is a schematic view illustrating that a display apparatus according to an example embodiment is applied to both eyes.

FIG. 9 is a schematic view illustrating that a display apparatus according to an example embodiment is applied to both eyes.

Referring to FIG. 9, a display apparatus 40 may include a left-eye image forming apparatus 100L for forming a left-eye image, a left-eye projection optical system 200L for projecting a left-eye image, and a plurality of left-eye holographic optical elements 300L for collimating an image projected by the left-eye projection optical system 200L into parallel beams L31L, L32L, and L33L having different emission angles, and a right-eye image forming apparatus 100R, a right-eye projection optical system 200R for projecting a right-eye image, and a plurality of right-eye holographic optical elements 300R for collimating an image projected by the right-eye projection optical system 200R into parallel beams L31R, L32R, and L33R having different emission angles. The left-eye image forming apparatus 100L and the right-eye image forming apparatus 100R may include light sources 131L and 131R and spatial light modulators 132L and 132R, respectively.

Images emitted from first to third left-eye sub-areas forming a left-eye image may be projected by the left-eye projection optical system 200L and incident on first to third left-eye holographic optical elements 331L, 332L, and 333 corresponding to the images. First to third left-eye images respectively formed in the first to third left-eye sub-areas may be different images according to a gaze direction of the left eye.

Images emitted from first to third right eye sub-areas forming a right-eye image may be projected by the right-eye projection optical system 200R and incident on first to third right-eye holographic optical elements 331R, 332R, and 333R corresponding to the images. First to third right-eye images respectively formed in the first to third right-eye sub-areas may be different images according to a gaze direction of the right eye. At this time, the first right eye parallel beam L31R diffracted by the first right eye holographic optical element 331R may be substantially parallel to the first left eye parallel beam L31L diffracted by the first left eye holographic optical element 331L. In addition, the second right eye parallel beam L32R diffracted by the second right eye holographic optical element 332R may be substantially parallel to the second left eye parallel beam L32L diffracted by the second left eye holographic optical element 332L. Similarly, the third right eye parallel beam L33R diffracted by the third right eye holographic optical element 333R may be substantially parallel to the third left eye parallel beam L33L diffracted by the third left eye holographic optical element 333L.

The first left-eye image and the first right-eye image may be images located in the same gaze direction from the left eye and the right eye, respectively, but may be different images viewed at different angles depending on the parallax between the left and right eyes. Similarly, the second left-eye image and the second right-eye image, and the third left-eye image and the third right-eye image may be images located in the same gaze direction from the left eye and the right eye, respectively, but may be different images viewed at different angles depending on the parallax between the left and right eyes.

The left-eye eye box LEB may be formed in an area where the first to third left-eye parallel beams L31, L32, and L33 collimated by the first to third left-eye holographic optical elements 331L, 332L, and 333L overlap, the right-eye eye box REB may be formed in an area where the first to third parallel beams L31R, L32R, and L33R collimated by the first to third right-eye holographic optical elements 331R, 332R, and 333R overlap.

The display apparatuses 30 and 40 according to the example embodiments of FIGS. 8 and 9 may provide a 3D stereoscopic image to a user by forming a plurality of images considering binocular parallax.

Figure 10:
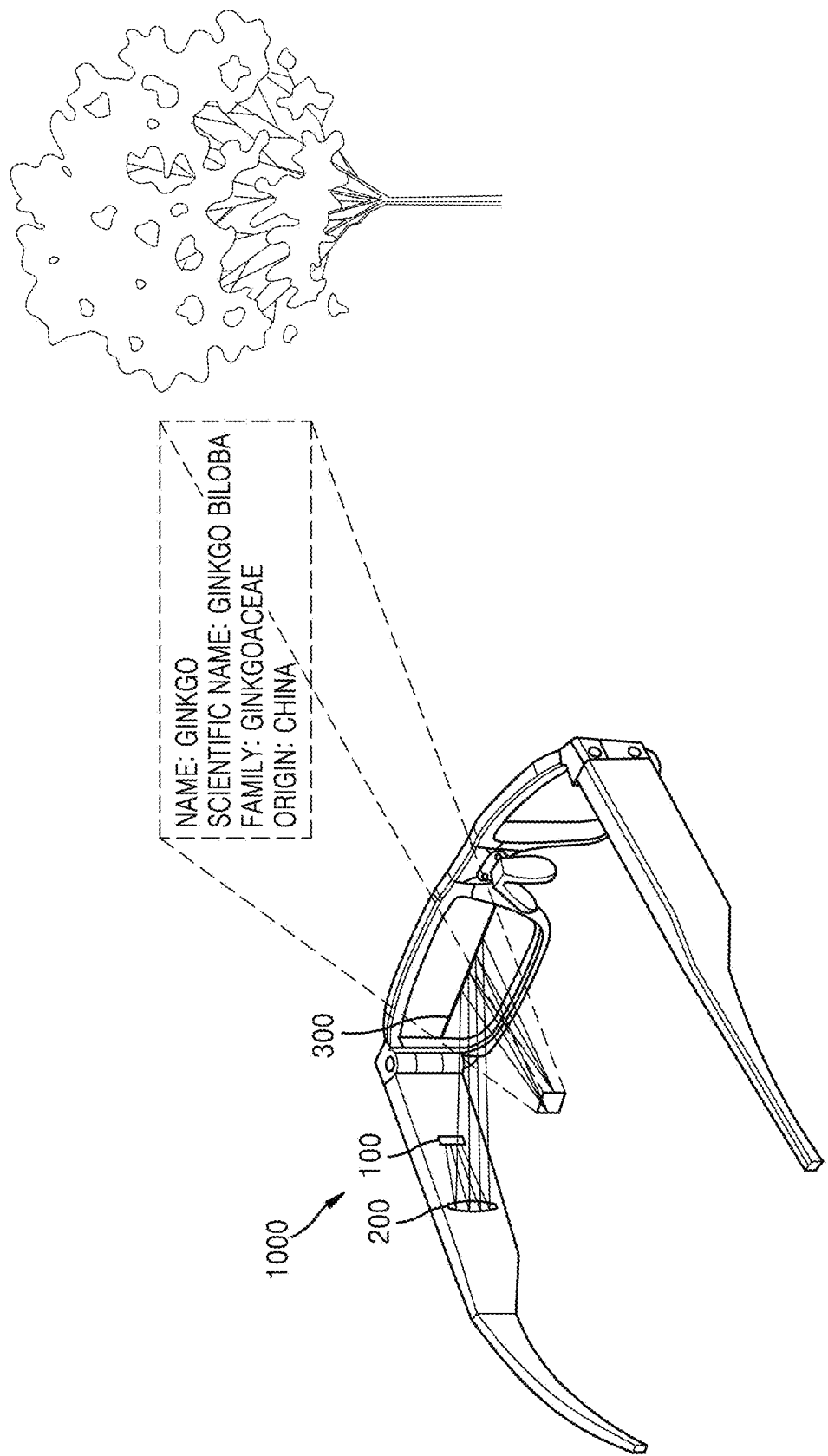
FIG. 10 is a view schematically illustrating use of a wearable device of a glasses type to which a display apparatus is applied according to an example embodiment.

FIG. 10 is a view schematically illustrating use of a wearable device of a glasses type to which a display apparatus is applied according to an example embodiment.

The wearable device 1000 may include one of the display apparatuses 10, 20, 30, and 40 described above with reference to FIGS. 1, 6, 7, 8 and 9. For example, one of the display apparatuses 10, 20, 30, and 40 may be provided in a left eye of the wearable device 1000. An image formed by the image forming apparatus 100 may be collimated into a parallel beam by the projection optical system 200 and the plurality of holographic optical elements 300 to form the eye box EB of a certain size. When the user's pupil is located within the eye box EB, the display apparatuses 10, 20, 30, and 40 may provide virtual image information according to a gaze direction of the user's pupil. In addition, such a wearable device may provide an external real landscape together with the virtual image information.

Figure 11:
FIGS. 11 to 13 show various electronic devices to which the display apparatus according to the example embodiments described above may be applied.
Figure 12:
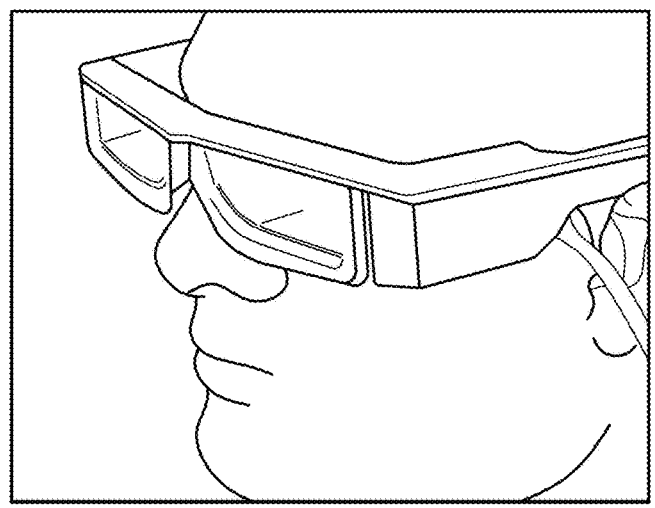
Figure 13:
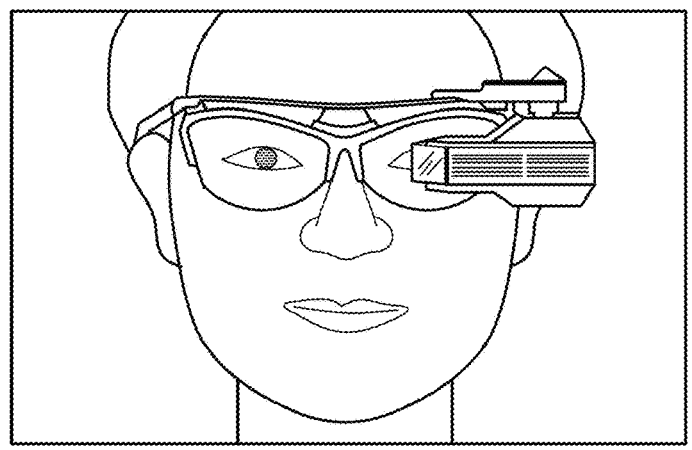

FIGS. 11 to 13 show various electronic devices to which the display apparatus according to the example embodiments described above may be applied.

As shown in FIGS. 11 to 13, the display apparatuses 10, 20, 30, and 40 may constitute a wearable device. In other words, the display apparatuses 10, 20, 30, and 40 may be applied to a wearable device. For example, the display apparatuses 10, 20, 30, and 40 may be applied to a head mounted display (HMD). The HMD may include a display such as a glasses-type display or a goggle-type display. The wearable electronic devices shown in FIGS. 11 to 13 may be operated in conjunction with a smartphone. The display apparatuses 10, 20, 30, and 40 may be a virtual reality (VR) display apparatus, an augmented reality (AR) display apparatus, or a mixed reality (MR) display apparatus manufactured as a head mounted type, glasses type, or goggles type capable of providing a VR or virtual image together with a real external landscape.

In addition, the display apparatuses 10, 20, 30, and 40 may be provided in a smartphone, and the smartphone itself may be used as a VR display apparatus, an AR display apparatus, or an MR display apparatus. In other words, the display apparatuses 10, 20, 30, and 40 may be applied to a small electronic device (mobile electronic device) that is not the wearable device as shown in FIGS. 10 to 12. In addition, application fields of the display apparatuses 10, 20, 30, and 40 may vary. For example, the display apparatuses 10, 20, 30, and 40 may be applied not only to implementing VR, AR, or MR, but also to other fields. For example, the display apparatus may also be applied to a small television or a small monitor that a user may wear.

A display apparatus according to an example embodiment may include a plurality of holographic optical elements, and light interacting with each holographic optical element may be collimated into parallel beams having different emission angles. The parallel beam emitted from each holographic optical element may travel toward the user's eye to form an eye box of a certain size and thus may provide an image observation area (or an eye box) that is expanded compared to a Maxwellian view optical system in which light converges to a focal point.

It should be understood that example embodiments described herein should be considered in a descriptive sense only and not for purposes of limitation. Descriptions of features or aspects within each example embodiment should typically be considered as available for other similar features or aspects in other example embodiments. While one or more example embodiments have been described with reference to the figures, it will be understood by those of ordinary skill in the art that various changes in form and details may be made therein without departing from the spirit and scope as defined by the following claims.

What is claimed is:
1. A display apparatus comprising:
an image forming apparatus including a plurality of sub-areas respectively configured to form a plurality of images by using light; and
a plurality of holographic optical elements corresponding to the plurality of sub-areas in a one-to-one manner, each of the plurality of holographic optical elements configured to collimate light emitted from the plurality of sub-areas corresponding to the plurality of images into respective parallel beams,
wherein each of the respective parallel beams are emitted in different directions such that at least two of the respective parallel beams corresponding to the plurality of images overlap on a single pupil of a user to form an eye box.

2. The display apparatus of claim 1, wherein each of the plurality of images has image information corresponding to different gaze directions.

3. The display apparatus of claim 2, wherein a first image, among the plurality of images, has first image information according to a first emission direction of first parallel beams collimated by a first holographic optical element, among the plurality of holographic optical elements, and
wherein a second image, among the plurality of images, has second image information according to a second emission direction of first parallel beams collimated by a second holographic optical element, among the plurality of holographic optical elements.

4. The display apparatus of claim 3, wherein a first gaze direction of the first image information corresponds to the first emission direction, and
wherein a second gaze direction of the second image information corresponds to the second emission direction.

5. The display apparatus of claim 1, wherein at least two of the plurality of images have different parallaxes.

6. The display apparatus of claim 5, wherein the plurality of sub-areas comprise a first left-eye sub-area, a second left-eye sub-area, a first right-eye sub-area, a second right-eye sub-area,
wherein the plurality of holographic optical elements comprise a first left-eye holographic optical element, a second left-eye holographic optical element, a first right-eye holographic optical element and a second right-eye holographic optical element,
wherein a first left-eye image formed in the first left-eye sub-area and a first right-eye image formed in the first right-eye sub-area have binocular parallax, and each of the first left-eye image and the first right-eye image has image information about a first gaze direction, and
wherein a second left-eye image formed in the second left-eye sub-area and a second right-eye image formed in the second right-eye sub-area have binocular parallax, and each of the second left-eye image and the second right-eye image has image information about a second gaze direction that is different from the first gaze direction.

7. The display apparatus of claim 1, wherein the plurality of holographic optical elements are arranged parallel to each other in a first direction, and
the eye box is formed parallel to the first direction.

8. The display apparatus of claim 7, wherein the plurality of holographic optical elements are in contact with each other.

9. The display apparatus of claim 1, wherein a long axis length of the eye box is equal to or greater than a pupil size.

10. The display apparatus of claim 1, wherein a long axis length of the eye box is about 5 mm to about 20 mm.

11. The display apparatus of claim 8, wherein the plurality of sub-areas simultaneously output the plurality of images, and the respective parallel beams are transmitted through the entire eye box at a same time.

12. The display apparatus of claim 11, wherein the plurality of images are formed on a retina of the user.

13. The display apparatus of claim 1, further comprising:
a projection optical system configured to project images generated in the plurality of sub-areas between the image forming apparatus and the plurality of holographic optical elements.

14. The display apparatus of claim 13, wherein the projection optical system comprises a collimator configured to collimate the light emitted from the plurality of sub-areas corresponding to the plurality of images.

15. The display apparatus of claim 13, wherein the projection optical system includes a plurality of sub-projection optical systems in one-to-one correspondence with the plurality of sub-areas, and
wherein the plurality of sub-projection optical systems are between the image forming apparatus and the plurality of holographic optical elements.

16. The display apparatus of claim 15, wherein the plurality of sub-projection optical systems comprises:
a first sub-projection optical system configured to a first image emitted from a first sub-area from among the plurality of sub-areas onto a first holographic optical element from among the plurality of holographic optical elements, and
a second sub-projection optical system configured to project a second image emitted from a second sub-area from among the plurality of sub-areas onto a second holographic optical element from among the plurality of holographic optical elements.

17. The display apparatus of claim 1, wherein the display apparatus comprises a head-mounted virtual reality (VR) or augmented reality (AR) display apparatus.

18. A display apparatus comprising:
an image forming apparatus configured to output a plurality of images;
a first holographic optical element configured collimate first light corresponding to a first image, among the plurality of images emitted from the image forming apparatus, into first parallel beams; and
a second holographic optical element configured collimate second light corresponding to a second image, among the plurality of images emitted from the image forming apparatus, into second parallel beams,
wherein the first parallel beams and the second parallel beams corresponding to the plurality of images overlap on a single pupil of a user to form an eye box.

19. The display apparatus of claim 18, wherein the image forming apparatus comprises a plurality of sub-areas respectively configured to form the plurality of images.

20. A display method comprising:
outputting, by an image forming apparatus, a plurality of images;
collimating, by a first holographic optical element, first light corresponding to a first image, among the plurality of images emitted from the image forming apparatus, into first parallel beams; and
collimating, by a second holographic optical element, second light corresponding to a second image, among the plurality of images emitted from the image forming apparatus, into second parallel beams,
wherein the first parallel beams and the second parallel beams corresponding to the plurality of images overlap on a single pupil of a user to form an eye box.

21. The display apparatus of claim 1, wherein the plurality of sub-areas comprise a first sub-area configured to form a first image, among the plurality of images, and a second sub-area configured to form a second image, among the plurality of images, the second image being different than the first image.

22. The display apparatus of claim 21, wherein the parallel beams comprise a first parallel beam corresponding to the first image and a second parallel beam corresponding to the second image.

* * * * *